United States Patent

Wang

[11] Patent Number: 6,097,282
[45] Date of Patent: Aug. 1, 2000

[54] MEMORY DEVICE HAVING THE FUNCTION OF DETECTING THE LOCKING OR UNLOCKING CONDITION OF A REMOTE CONTROLLER

[76] Inventor: Wei Te Wang, No. 21, Alley 9, Lane 27, Sec. 5, Min Sheng E. Rd., Taipei, Taiwan

[21] Appl. No.: 09/139,626

[22] Filed: Aug. 24, 1998

[51] Int. Cl.[7] .................................................. B60R 25/10
[52] U.S. Cl. .......................... 340/426; 307/10.2; 340/457; 340/539; 340/825.69
[58] Field of Search ..................................... 340/540, 539, 340/506, 426, 457, 505, 825.54, 825.69, 10.1, 10.6; 307/10.2

[56] References Cited

U.S. PATENT DOCUMENTS

| | | | |
|---|---|---|---|
| 5,568,120 | 10/1996 | LeMense et al. | 340/426 |
| 5,808,547 | 9/1998 | Carney | 340/541 |

*Primary Examiner*—Thomas Mullen
*Attorney, Agent, or Firm*—Rosenberg, Klein & Lee

[57] ABSTRACT

A memory device having the function of detecting the locking or unlocking condition of a remote controller comprises a battery, a key circuit a memory unit, a light emitting element, a testing key, an encoding unit, an infrared ray or a high frequency emitting driving circuit, etc. The positive end of the battery is connected with the power source (V+) of the memory unit. The lock key and unlock key of the key circuit are connected with the respective input end of the memory unit and the encoding unit. The output end of the memory unit is connected with one end of the light emitting element. Another end of the light emitting element is connected with one connection of the testing key and another end of the testing key is grounded. By the action of the testing key, the condition of the remote controller may inform the user. That is, if it is in a lock condition, then the light emitting element will light, while if it is in a "unlock" condition, then the light emitting element will extinguish. Therefore, by the special circuit design, the user may be informed about the message of the remote controller without returning to the original location to know the lock (or unlock) condition of the controller, such as the anti-theft device of a car or a motorcycle, an iron scrolling door, or a host without any setting function.

11 Claims, 8 Drawing Sheets

MEMORY DEVICE HAVING THE FUNCTION OF DETECTING THE LOCKING OR UNLOCKING CONDITION OF A REMOTE CONTROLLER

BACKGROUND OF THE INVENTION

1. Field of the Invention

The present invention relates to a memory device having the function of detecting the locking or unlocking condition of a remote controller, especially to a memory device by which the remote user may know the message of a remote controller directly

2. Background of the Invention

In the current busy environment, the user often forgets some things after he (or she) has left some place, for example, to set the anti-theft device of a car or a motorcycle, the remote controller of an iron scrolling door, etc. The user probably recalls these things after he has walked a period of time and desires to assert whether the anti-theft device of a car or a motorcycle, or the remote controller of a iron scrolling door have been set. Generally he (or she) must return to the original place. Therefore, it has consumed much time and labor.

Therefore, it is necessary to have a novel device by which the remote user may know the message of a remote controller directly.

SUMMARY OF THE INVENTION

Accordingly, the object of the present invention is to provide a memory device having the function of detecting the locking or unlocking condition of a remote controller, by which the remote user may know the message of a remote controller directly, wherein the inner circuit within the remote controller is further provided with a memory unit (flip-flop), a testing key, and a light emitting element. If the testing key is in a "lock" condition, the light emitting element will light, and vice versa. Therefore, the user may be informed about the status of the remote controller without returning to the original location to check the lock (or unlock) condition of the controller, such as the anti-theft device of a car or a motorcycle, an iron scrolling door, or a host without any setting function (for some cars, when the key has been pulled out from die anti-theft host, after 30 to 40 seconds, the car will be locked by an automatic setting).

Another object of the pre t invention is to prevent error adjustments (if the key of the key circuit are used m common, after clicking, the function of the key will be present) and to save power (i.e., in testing, power only consumes during clicking).

The present invention will be better understood and its numerous objects and advantages will become apparent to those skilled in the art by referencing to the following drawings in which:

DETAILED DESCRIPTION OF THE PREFERRED EMBODIMENT

Figure 1:
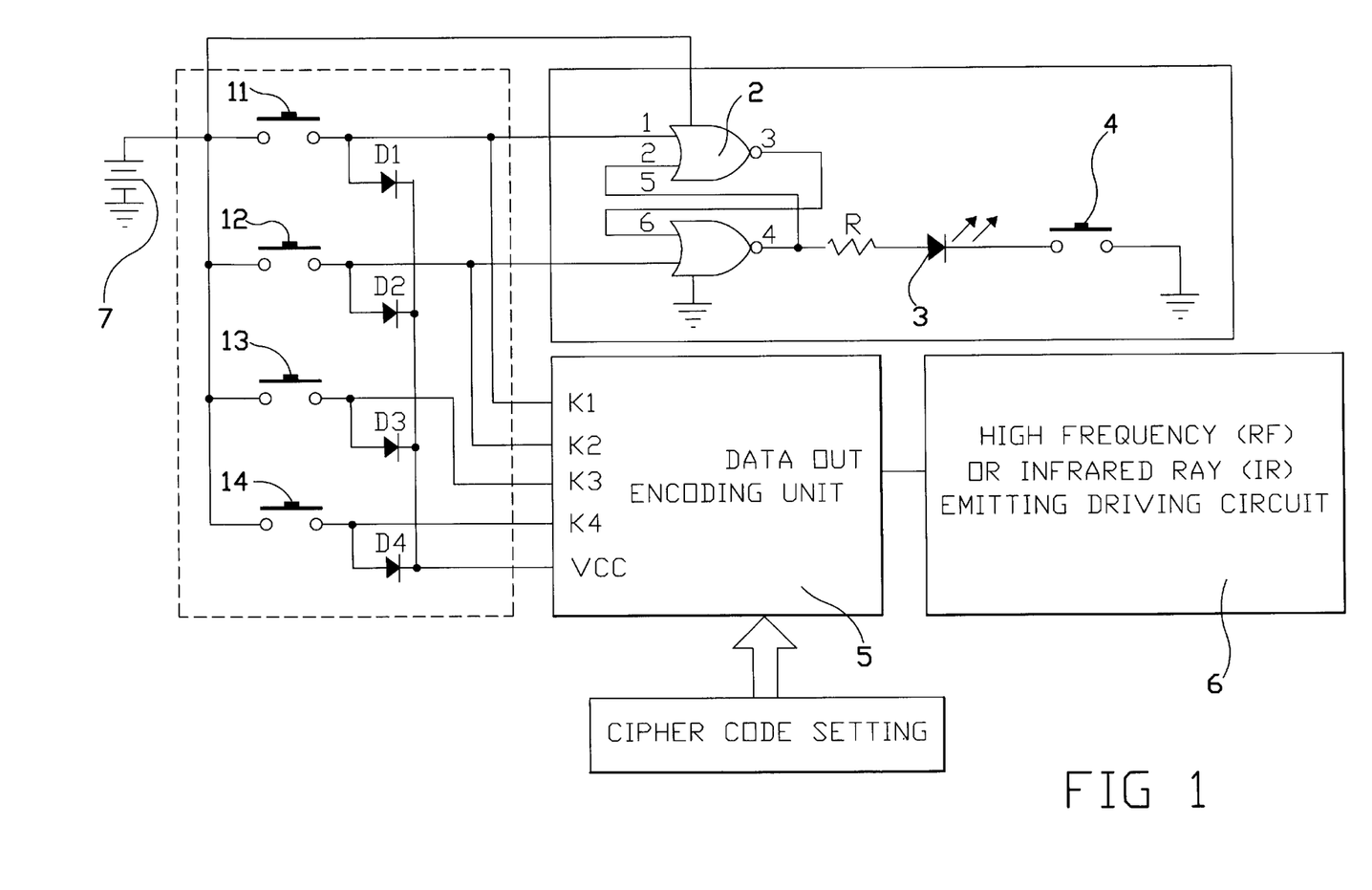
FIG. 1 is a circuit block of the present invention.
Figure 2:
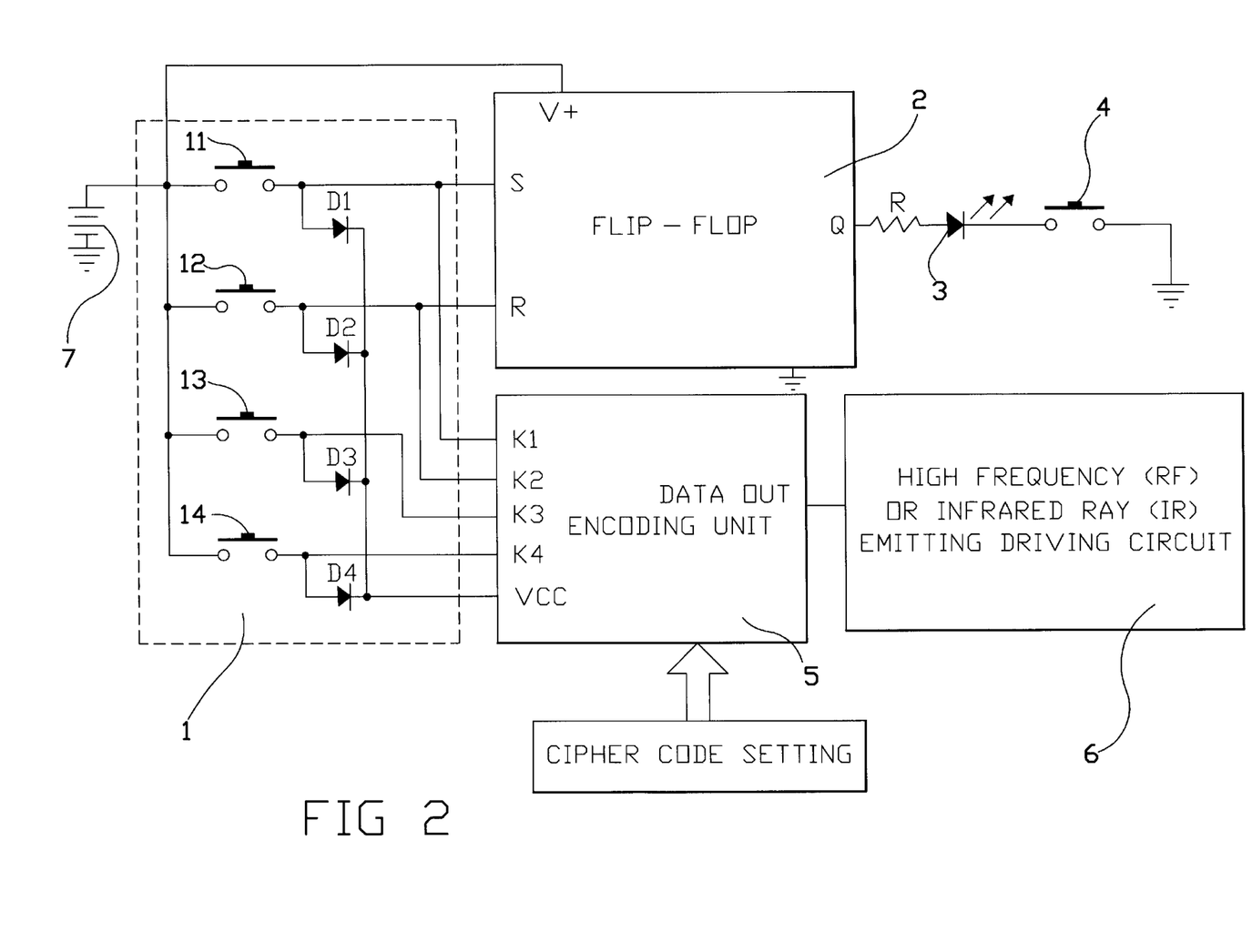
FIG. 2 is another circuit block diagram of the present invention.

As shown in FIGS. 1 and 2, the memory device having the function of detecting the locking or unlocking condition of a remote controller of the present invention comprises a key circuit 1, a memory unit 2, a light emitting element (LED) 3, a testing key (4), an encoding unit 5, an infrared ray (IR) or a high frequency (RF) emitting driving circuit 6, a battery 7, etc.

The key circuit 1 includes a lock key 11, an unlock key 12, a first function key (alarm) 13, a second function key 14 (car-searching) and diodes D1~D4. The connections of the key 11–14 are connected with the positive end of the battery 7, while the negative end of the battery is grounded. Another connections of the keys are connected with the pins (K1~K4) of the encoding unit 5, respectively. Then they are connected with the pin VCC of an encoding IC 5. The output end of the encoding unit 5 is connected with the infrared ray (IR) or high frequency (RF) emitting driving circuit 6.

The encoding unit 5 can generate encoding signals and output the signals as the key circuit is clicked, and then the signals are transmitted through the infrared ray or high frequency emitting driving circuit 6 so that the cipher codes may be transferred to the receiver. The receiver is located in a vehicle, for example, and electrically connected to the vehicle's locking system. Actuation of lock key 11 or unlock key 12, respectively, locks or unlocks the vehicle. As shown in FIG. 1, actuation of the second function (car-searching) key 14 causes the emitting driving circuit 6 to generate a signal to be received by the receiver in the vehicle. The received signal causes the actuation of an indicating means, such as flashing lights or a honking horn, for example, as is well known in the art.

The memory unit 2 is a flip-flop formed by a NOR gate (as shown in FIG. 1) or a R–S flip-flop (as shown in FIG. 2). The input ends, S and R ends, of the flip-flop are connected with the other end of the lock key 11 and the unlock key 12. The power source end (V+) of the flip-flop 2 is connected with the positive end of the battery 7. The output end of the flip-flop 2 is connected with the light emitting element (LED) through a resistor R. The negative end of the light emitting element 3 is connected with one connection of the testing key 4, and another end of the testing key 4 is grounded.

When the lock key 11 is clicked, the flip-flop 2 will be triggered, so that the output is a high voltage. When the unlock key 12 is released, the flip-flop 2 will be clicked so that the output is a low voltage.

When the testing key is clicked, if the output of the flip-flop is in high voltage, then the light emitting element 3 will light. This means that the previous clicking key is the lock key 11; if the output of the flip-flop 2 is in low voltage, then the light emitting element will not light. This means that the previous clicking key is the unlock key 12. Therefore, whether the previous clicking key is the lock key 11 or the unlock key 12 may be known. The user of the remote lock actuator can, thus, determine if the vehicle was locked or not by checking the memory unit 2 for the last key actuation. The system relies wholly on the memory unit 2 for actuation testing and does not receive signals from the vehicle.

Figure 3:
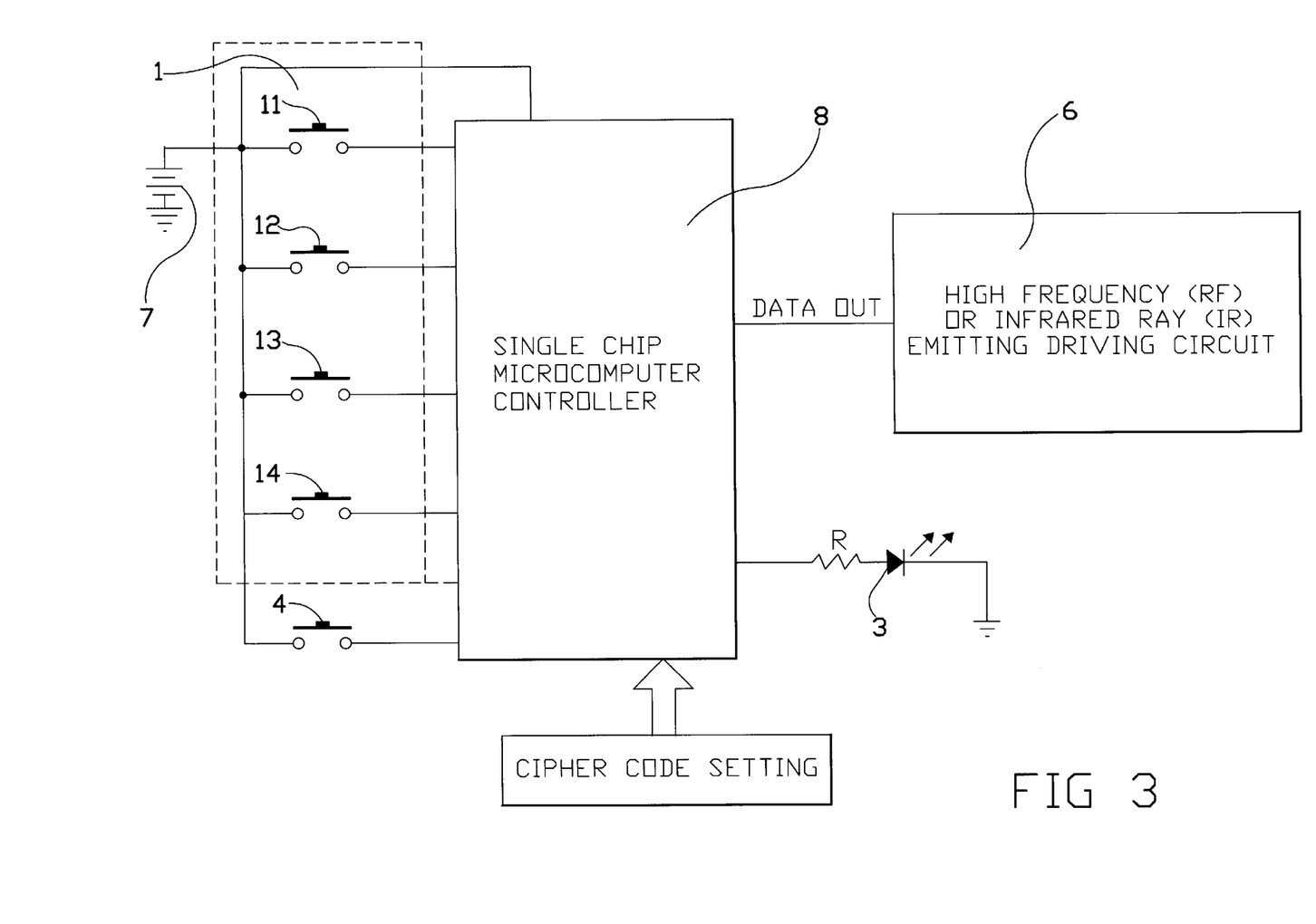
FIG. 3 is a circuit block diagram showing the present invention controlled by a single chip microcomputer controller.

Referring now to FIG. 3, the present invention may be performed by a single chip microcomputer controller 8 without any flip-flop or diodes. The single chip microcomputer controller 8 is used to drive a light emitting element. The output port of the single chip microcomputer controller 8 may be connected with a LED 3 through a resistor R. The testing key 4 is connected between the battery 7 and the single chip microcomputer controller 8. When the testing key 4 is clicked, if the default within the single chip microcomputer controller 8 is initiated, then a high voltage is outputted to the light emitting element 3 and the light emitting element 3 will light, and vice versa.

Figure 4:
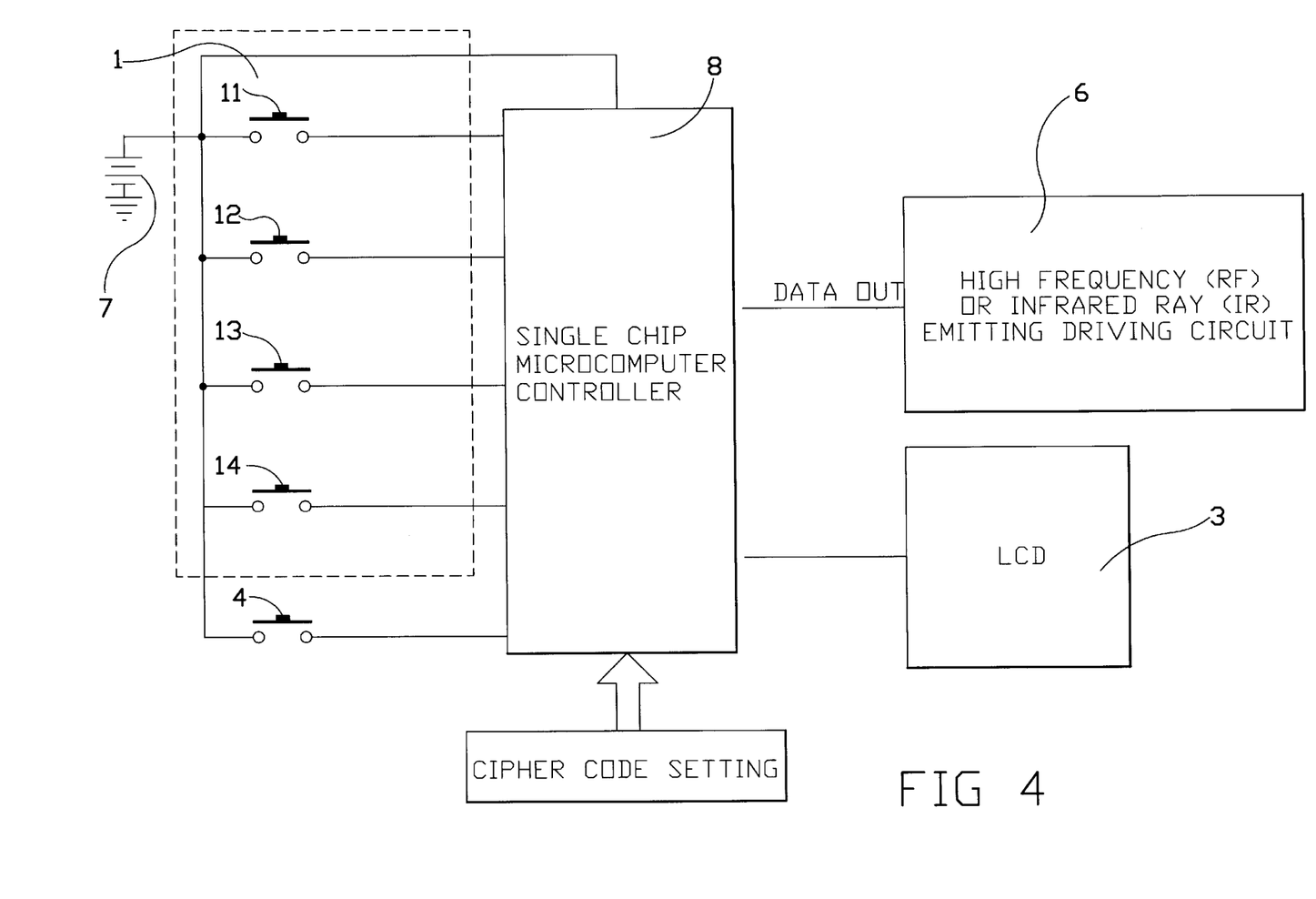
FIG. 4 is another circuit block diagram showing the present invention controlled by a single chip microcomputer controller.

Referring to FIG. 4, the present invention is performed by the single chip microcomputer controller and LCD displaying without flip-flops, diodes and testing keys. A liquid crystal display (LCD) 3 is connected on the output port of a single chip microcomputer controller 8, If the lock key 11 is clicked, then LCD will display "lock" (then "unlock" message is disappears). If the unlock key 12 is clicked, then message "unlock" is displayed (then "lock" disappears).

Figure 5A:
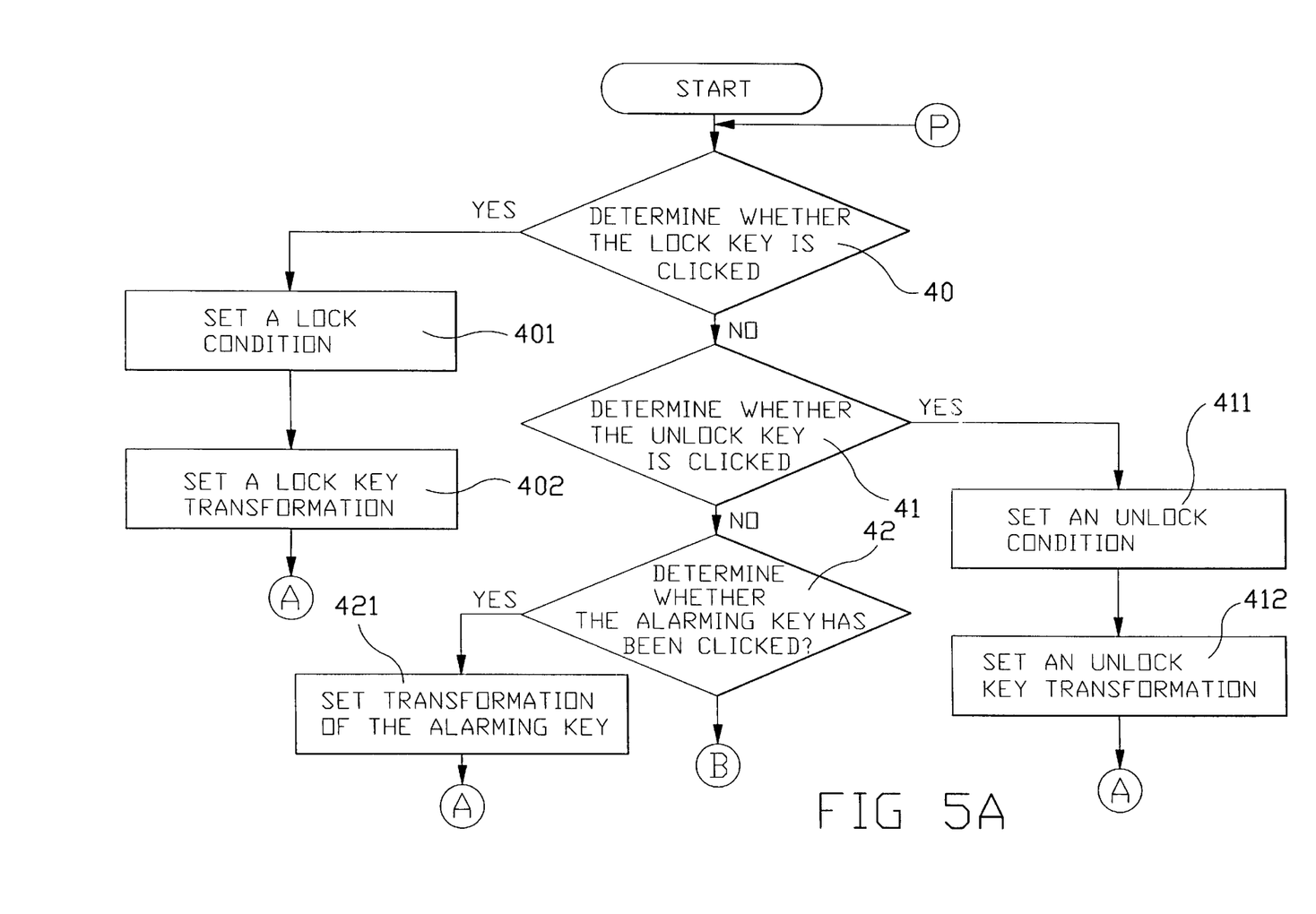
FIG. 5 is a flow diagram about the process of the program of the single chip microcomputer controller of the present invention.
Figure 5B:
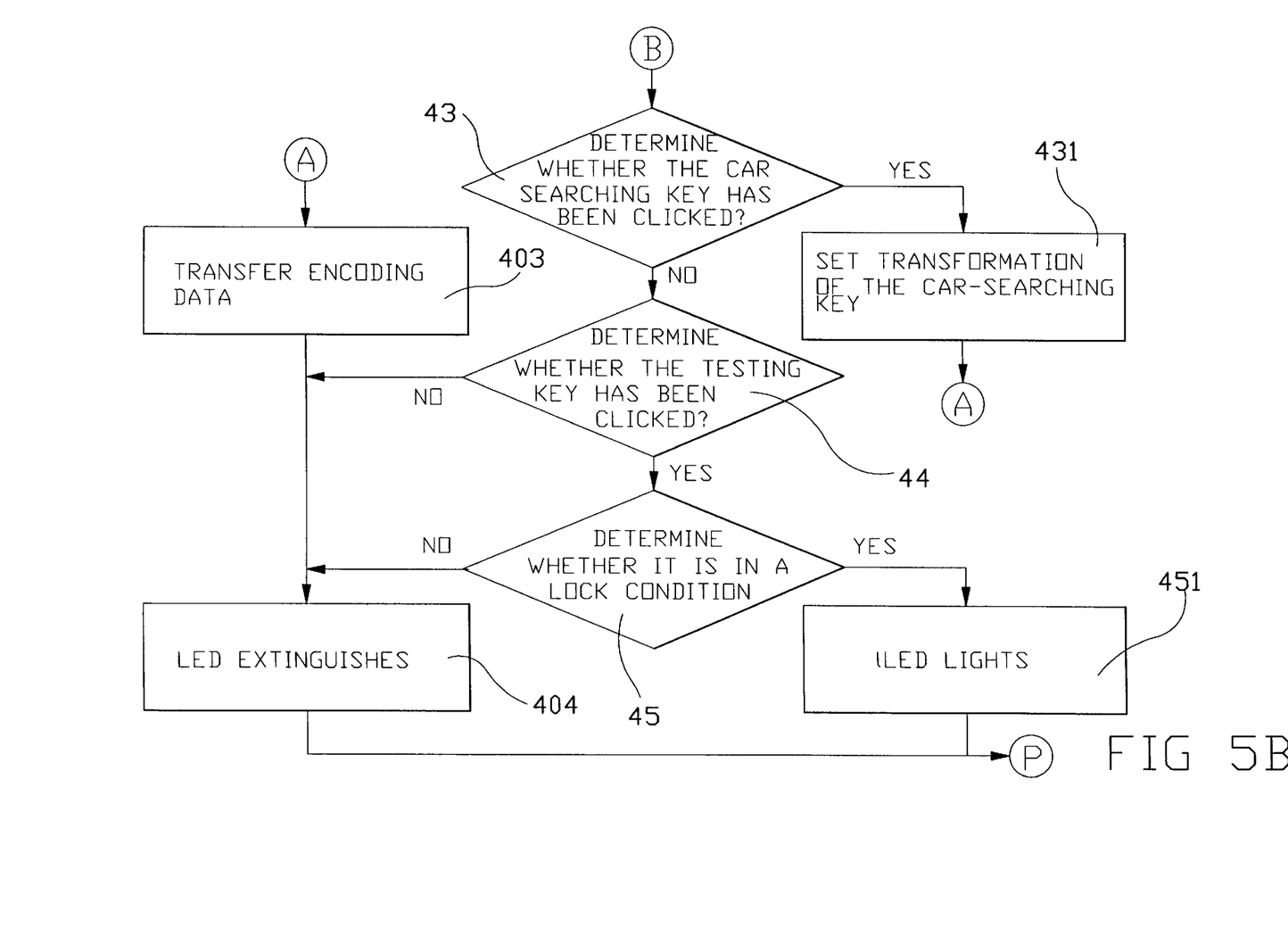

Referring now to FIG. 5, the flow diagram for processing the program of the single chip microcomputer controller is shown. A LCD display is used to provide the message regarding a remote controller.

Initially, it is determined that the lock key is clicked (step 40).

If yes, the process sets a lock condition (step 401), and then further sets a lock key transformation (step 402), and transfers encoding data (step 403). Thereby, LED extinguishes (step 404) and the process returns to step 40. If no, it determines whether the unlock key is clicked (step 41)?

If yes, the process sets an unlock condition (step 411), and then further sets an unlock key transformation (step 412), and process proceeds to step 403. If no, it determines whether the first function key (alarming key) has been clicked (step 42)?

If yes, the process sets transformation of the first function key (alarming key) (step 421), and the process returns to step 403. If no, it determines whether the second function key has been clicked (step 43)?

If yes, the process sets transformation of the second function key (car-searching key) (step 431) and the process returns to step 403. If no, it determines whether the testing key has been clicked (step 44)?

If no, the LED extinguishes (step 404), and process returns to step 40. If yes, it determines whether in a lock condition (step 45)?

If no, the LED extinguishes (step 404), and process returns to step 40. If yes, the LED lights (step 451), and process returns to step 40.

Figure 6A:
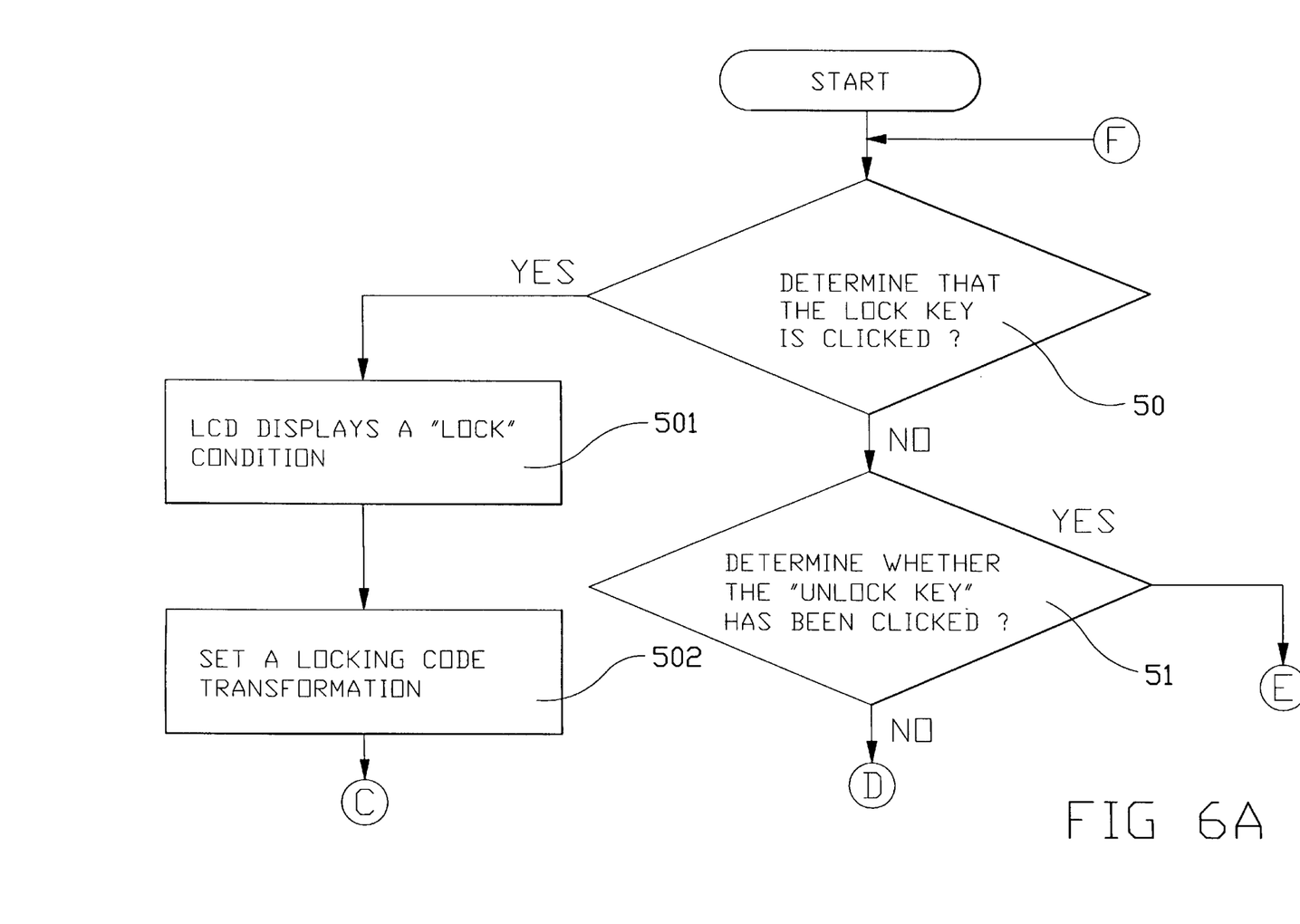
FIG. 6 is another flow diagram about the process of the program in a single chip microcomputer controller of the present invention.
Figure 6B:
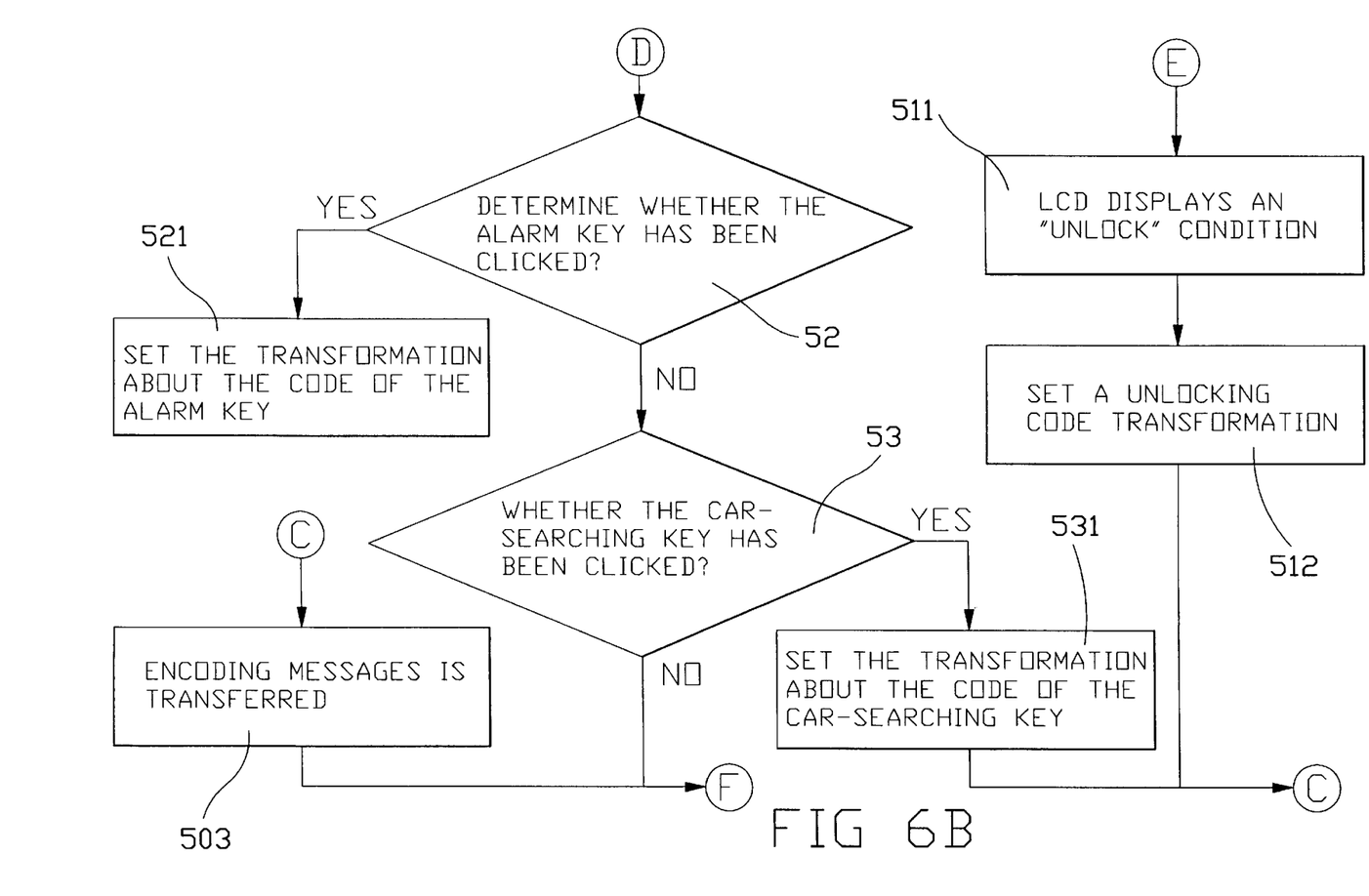

Referring to FIG. 6, the flow diagram for processing the program of the single chip microcomputer controller is shown. A ICD display is used to provide the message regarding a remote controller.

Initially, the program determines whether the lock key is clicked (step 50)?

IF yes, the LCD displays a "lock" condition (step 501), and the process sets a locking code transformation (step 502), encoding messages are transferred (step 503) and the process returns to step 50. If no, it determines whether the "unlock key" has been clicked (step 51)?

If yes, the LCD displays an "unlock" condition (step 511), then it sets a unlocking code transformation (step 512), and the process proceeds to step 503. If no, the process determines whether the second function key (alarm key) has been clicked (step 52)?

If yes, the process sets the transformation of the code of the first function key (alarm key) (step 521), and then the process returns to step 503. If no, it determines whether the second function key (car-searching key) has been clicked (step 53)?

If yes, the process sets the transformation about the code of the second function key (car searching key) (step 531), and then the process returns to step 503. If no, the process returns to step 50.

Accordingly, in the present invention, by the special circuit design, the user may be informed about the message of the remote controller without returning to the original location to know the lock (or unlock) condition of the controller.

Although the invention has been described in detail with reference only to a preferred embodiment, those skilled in the art will appreciate that various modifications can be made without departing from the invention. For example, the LED of the present invention may be used with the LED of a current commercial remote controller. Accordingly, the invention is defined only by the following claims which are intended to embrace all equivalents thereof.

DESCRIPTION OF THE NUMERALS IN FIGURES 1 key circuit
11 lock key
12 unlock key
13 first function key (alarming key)
14 second function key (car searching key)
2 memory unit
3 light emitting element
4 testing key
5 encoding unit
6 infrared ray or hi frequency emitting driving circuit
7 battery
8 single chip microcomputer controller

What is claimed is:

1. A memory device having the function of detecting locking or unlocking condition of a remote controller, comprising:

a battery;

a key circuit including a lock key and an unlock key, one end of the lock key and the unlock key being connected with a positive terminal of the battery;

an encoding unit connected with a second end of the lock key and the unlock key of the key circuit, the output end of said encoding unit being connected with an emitting driving circuit, whereby when one key of the key circuit is actuated, the encoding unit will generate a code and output the code through said emitting driving circuit;

a memory unit having an input end which is connected with said second end of the lock key and the unlock key of the key circuit, and a power source thereof connected with the positive terminal of the battery;

a light emitting element having one end connected to an output end of the memory unit; and a testing key having one end connected to a second end of the light emitting element, and a second end thereof being grounded, whereby when the testing key is actuated, (1) if the output of the memory unit is in high voltage, then the light emitting element will light; and (2) if the output of the memory unit is in low voltage, then the light emitting element will not light.

2. The memory device having the function of detecting the locking or unlocking condition of a remote controller as recited in claim 1, wherein the memory unit is a flip-flop element.

3. The memory device having the function of detecting the locking or unlocking condition of a remote controller as recited in claim 1, wherein the memory unit may be formed by a logic circuit.

4. The memory device having the function of detecting the locking or unlocking condition of a remote controller as recited in claim 1, wherein the key circuit further includes a key having the function of alarming.

5. The memory device having the function of detecting the locking or unlocking condition of a remote controller as recited in claim 1, where the key circuit further includes a key having the function of searching a car.

6. A memory device having the function of detecting locking or unlocking condition of a remote controller, comprising:

a battery;

a key circuit including a lock key and an unlock key, one end of the lock key and of the unlock key being connected with the positive end of the battery;

a single chip microcomputer controller connected with the lock key and the unlock key of the key circuit, the output thereof is connected with an emitting driving circuit, whereby the single chip microcomputer controller can drive the emitting driving circuit to transfer signals according to actuation of said lock key or said unlock key of said key circuit;

a light emitting element one end of which is connected with the output end of the single chip microcomputer controller, and a second end thereof being grounded; and a testing key connected between a positive terminal of said battery and the single chip microcomputer controller, whereby when the testing key is actuated, if a preset condition within the single chip microcomputer controller is met, then a high voltage will be outputted to the light emitting element so that the light emitting element will light, and if the output is in low voltage, then the light emitting element will not light.

7. The memory device having the function of detecting the locking or unlocking condition of a remote controller as recited in claim 6, wherein the key circuit further includes a key having the function of alarming.

8. The memory device having the function of detecting the locking or unlocking condition of a remote controller as recited in claim 6, wherein the key circuit further includes a key having the function of searching a car.

9. A memory device having the function of detecting locking or unlocking condition of a remote controller, comprising:

a battery;

a key circuit including a lock key and an unlock key, one end of the lock key and the unlock key being connected with a positive terminal of the battery;

a single chip microcomputer controller connected with the lock key and the unlock key of the key circuit, the output thereof is connected with an emitting driving circuit, whereby the single chip microcomputer controller can drive the emitting driving circuit to transfer signals according to actuation of said lock key or said unlock key of said key circuit; and a liquid crystal display connected with the output port of said single chip microcomputer controller for displaying the condition of the remote controller, that is, when the lock key is actuated, the liquid crystal display will display "lock"; when the unlock key is actuated, then the liquid crystal display will display "unlock".

10. The memory device having the function of detecting the locking or unlocking condition of a remote controller as recited in claim 9, wherein the key circuit further includes a key having the function of alarming.

11. The memory device having the function of detecting the locking or unlocking condition of a remote controller as recited in claim 9, wherein the key circuit further includes a key having the function of searching a car.

\* \* \* \* \*